United States Patent
Milani et al.

(10) Patent No.: US 11,208,943 B2
(45) Date of Patent: Dec. 28, 2021

(54) MARINE OUTBOARD MOTOR WITH PISTON COOLING GALLERY

(71) Applicant: COX POWERTRAIN LIMITED, Shoreham-By-Sea (GB)

(72) Inventors: Michele Milani, Shoreham-By-Sea (GB); Arun Dhanapala, Shoreham-By-Sea (GB)

(73) Assignee: COX POWERTRAIN LIMITED, Shoreham-By-Sea (GB)

( * ) Notice: Subject to any disclaimer, the term of this patent is extended or adjusted under 35 U.S.C. 154(b) by 2 days.

(21) Appl. No.: 16/827,965

(22) Filed: Mar. 24, 2020

(65) Prior Publication Data
US 2020/0318526 A1  Oct. 8, 2020

(30) Foreign Application Priority Data

Apr. 4, 2019 (GB) .................................... 1904779

(51) Int. Cl.
  *F01P 3/10* (2006.01)
  *F02B 61/04* (2006.01)
  *F02F 3/22* (2006.01)
(52) U.S. Cl.
  CPC .............. *F01P 3/10* (2013.01); *F02B 61/045* (2013.01); *F02F 3/22* (2013.01)
(58) Field of Classification Search
  CPC ..................... F01P 3/10; F16J 1/09; F16J 9/24
  USPC ......... 123/193.6, 41.35; 29/888.04, 888.042, 29/888.044; 92/172, 181 R
  See application file for complete search history.

(56) References Cited

U.S. PATENT DOCUMENTS 1,605,810 A * 11/1926 Cormier ................... F16J 9/063
                                                                92/193
2,606,085 A *  8/1952 Kiekhaefer ................ F16J 9/24
                                                                92/216
(Continued)

FOREIGN PATENT DOCUMENTS

EP       1198667      4/2002
JP    2001-164990    6/2001

OTHER PUBLICATIONS

Combined Search and Examination Report issued in App. No. GB1904779.4 (dated 2019).
(Continued)

*Primary Examiner* — George C Jin
*Assistant Examiner* — Teuta B Holbrook
(74) *Attorney, Agent, or Firm* — Barnes & Thornburg LLP

(57) ABSTRACT

A piston for an internal combustion engine is provided. The piston includes a piston body including an upper combustion surface, an annular side wall with a ring belt region, and a cooling gallery located within the piston body having a fluid inlet. A piston ring is located in a ring groove around the ring belt region and an alignment pin is secured in a hole in the piston side wall to restrict circumferential displacement of the piston ring. The piston body further includes a boss within the cooling gallery into which the hole and the alignment pin extend. The boss projects into the cooling gallery opposite the fluid inlet and is shaped to provide a flow splitter surface configured to divide cooling fluid flowing through the fluid inlet during use into first and second fluid flows and to direct the first and second fluid flows in opposite directions around the cooling gallery.

17 Claims, 9 Drawing Sheets

(56) References Cited

U.S. PATENT DOCUMENTS

| | | | | |
|---|---|---|---|---|
| 4,367,702 A * | 1/1983 | Lassanske | F16J 9/00 | 123/182.1 |
| 4,962,691 A * | 10/1990 | Kanao | F16J 9/24 | 277/445 |
| 5,211,102 A | 5/1993 | Muta | | |
| 5,890,416 A * | 4/1999 | Thieme | F02F 3/22 | 92/186 |
| 6,378,872 B1 * | 4/2002 | Moriarty | F16J 9/16 | 277/310 |
| 6,457,721 B1 * | 10/2002 | Bloemers | F16J 9/24 | 277/445 |
| 7,748,361 B2 * | 7/2010 | Linz | F02F 3/22 | 123/193.6 |
| 8,122,935 B2 * | 2/2012 | Kollotzek | F02F 3/22 | 164/369 |
| 8,662,047 B2 * | 3/2014 | Ostojic | F02N 19/004 | 123/193.2 |
| 9,382,869 B2 * | 7/2016 | Freidhager | F02F 3/16 | |
| 2002/0162448 A1 | 11/2002 | Martin et al. | | |
| 2008/0289490 A1 * | 11/2008 | Linz | F02F 3/22 | 92/186 |
| 2015/0059682 A1 * | 3/2015 | Weinenger | F02F 3/0092 | 123/193.6 |
| 2015/0198114 A1 * | 7/2015 | Zauner | F02F 3/08 | 123/294 |
| 2017/0314452 A1 * | 11/2017 | Park | B22C 9/105 | |
| 2017/0314504 A1 * | 11/2017 | Yoo | B22C 9/105 | |

OTHER PUBLICATIONS

Search Report & Written Opinion issued in Int'l App. No. PCT/GB2020/050864 (dated 2020).

* cited by examiner

MARINE OUTBOARD MOTOR WITH PISTON COOLING GALLERY

CROSS REFERENCE TO RELATED APPLICATIONS

This application claims priority to United Kingdom patent application no. 1904779.4, filed Apr. 4, 2019. The disclosure set forth in the referenced application is incorporated herein by reference in its entirety.

TECHNICAL FIELD

The present invention relates to a marine outboard motor with an internal combustion engine comprising a piston including a cooling gallery located within the piston body and an alignment pin configured to restrict circumferential displacement of a piston ring extending around the piston body.

BACKGROUND

To maintain engine performance and avoid premature piston wear, it is important to avoid excessive piston temperatures during operation. In modern diesel engines, this is often achieved by incorporating a cooling gallery within the piston body. During operation, a cooling fluid, such as crankcase oil, is circulated around the cooling gallery to reduce the temperature of the upper combustion surface of the piston. The cooling fluid may be supplied to gallery inlets along the piston rod, or sprayed against the underside of the piston body from an oil jet located beneath the piston body. Such cooling galleries are particularly effective with diesel internal combustion engines, in which the combustion surface is typically bowl shaped and the maximum temperature occurs around the rim of the combustion surface rather than at the centre. This can also be the case with direct injection petrol engines having a bowl shaped combustion surface. By including a cooling gallery within the piston body inward of the ring belt, the temperature at around the rim of the combustion surface can be reduced effectively and the maximum piston temperature reduced accordingly.

Adjacent to the cooling gallery and on the outside of the annular side wall of the piston body, the ring belt typically includes a number of annular ring grooves within which piston rings are located. The piston rings are usually split rings having a ring gap between their opposed ends. To maintain the proper function of the piston rings, it can be beneficial to restrict the circumferential displacement of the piston rings within the ring grooves. This enables the circumferential positions of the ring gaps to be maintained in a staggered arrangement to ensure adequate and even lubrication, and avoid excessive oil consumption and increased blow-by gases which might otherwise occur if the ring gaps were aligned. This can be particularly important with vertical axis engines, such as those often used in marine outboard motors, in which the cylinder bores are horizontally aligned and in which gravitational effects can further encourage ring gap alignment.

To restrict piston ring rotation within the ring grooves, it is known to secure an alignment pin within a hole in a given ring groove so that the alignment pin projects into the ring groove and engages with the piston ring in that groove. Typically, the alignment pin is received in the ring gap so that circumferential movement of the piston ring is prevented by the alignment pin. When alignment pins are used in combination with a cooling gallery, the alignment pin is usually secured in a through-hole which extends from the ring groove into the cooling gallery. However, with this arrangement, it is possible for the alignment pin to fall into the cooling gallery during operation. This can cause an obstruction to cooling fluid flow around the cooling gallery and therefore be detrimental to cooling performance. Additionally, if the alignment pin is no longer correctly located in the hole in the ring groove, this can lead to an excessive flow of cooling fluid to the ring belt via the hole in the ring groove, resulting in poor emissions and high consumption rates of cooling fluid.

The present invention seeks to provide an improved marine outboard motor which overcomes or mitigates one or more problems associated with the prior art.

SUMMARY OF THE INVENTION

According to a first aspect of the present invention, there is provided a marine outboard motor having an internal combustion engine, the internal combustion engine comprising: an engine block defining at least one cylinder; and a piston disposed in the at least one cylinder, wherein the piston comprises: a piston body including an upper combustion surface, an annular side wall with a ring belt region, and a cooling gallery located within the piston body radially inwardly from the ring belt region and having a fluid inlet through which a cooling fluid is supplied to the cooling gallery during operation; a piston ring located in a ring groove around the ring belt region; and an alignment pin secured in a hole in the piston side wall and projecting into the ring groove to restrict circumferential displacement of the piston ring, wherein the piston body further comprises a boss within the cooling gallery into which the hole and the alignment pin extend, wherein the boss projects into the cooling gallery opposite the fluid inlet and is shaped to provide a flow splitter surface configured to divide cooling fluid flowing through the fluid inlet during use into first and second fluid flows and to direct the first and second fluid flows in opposite directions around the cooling gallery.

With this arrangement, the boss forms a local increase in the thickness of the side wall of the piston body and thereby provides additional material into which the hole is provided. This allows the alignment pin, or "anti-rotation pin", to be more securely retained in position and prevents any risk that the alignment pin might fall into the cooling gallery during operation and thereby cause an obstruction to cooling fluid flow around the cooling gallery. Additionally, the boss also acts as a flow splitter to improve the circulation of cooling fluid around the cooling gallery and thereby reduce the maximum operating temperature of the piston. Thus, with the present invention, the boss serves the dual functions of both improving alignment pin retention and improving piston cooling performance.

The cooling gallery may be part-annular. The cooling gallery may be arcuate. Preferably, the cooling gallery is annular.

The boss projects into the cooling gallery along only part of the total length of the cooling gallery. Preferably, the boss projects into the cooling gallery along less than 20 percent of the total length of the cooling gallery, more preferably less than 10 percent. Where the cooling gallery is annular, preferably the boss projects into the cooling gallery over a segment of the annular cooling gallery having an angular extent of less than 70 degrees, more preferably less than 35 degrees.

Where the cooling gallery is annular, the flow splitter surface is preferably configured to direct the first fluid flow around the annular cooling gallery in a first circumferential direction and to direct the second fluid flow around the annular cooling gallery in a second circumferential direction which is opposite to the first circumferential direction. In this manner, the combustion surface can be cooled more effectively and evenly.

Preferably, the flow splitter surface is substantially symmetrical. This can facilitate an even division of the flow of cooling fluid and consistent cooling performance on either side of the flow splitter. In other examples, the flow splitter surface may be asymmetrical such that the flow of cooling fluid is divided unevenly. This may be beneficial where the cooling requirements of the cooling gallery differ on either side of the flow splitter surface.

Preferably, the flow splitter surface has a curved shape. That is, the flow splitter surface has a shape which has at least one curved portion. This can facilitate smooth division of the flow of cooling fluid and a smooth transition from an entry direction to a flow direction around the cooling channel. For example, the boss may have a cross-sectional shape in the form of an arch. In other examples, the flow splitter surface may have an angular shape, such as a triangular shape. In certain embodiments, the flow splitter surface has a curved peak, side flanks extending away from the curved peak, and curved ramps which form a transition between the side flanks and the adjacent surface of the cooling gallery. The side flanks may be linear. The side flanks may be curved.

Preferably, the flow splitter surface is aligned with the fluid inlet. In such an arrangement, the flow splitter surface has a central axis which is aligned with the central axis of the fluid inlet. This can facilitate an even division of the flow of cooling fluid and consistent cooling performance on either side of the flow splitter. In other examples, the flow splitter may be radially and/or axially offset from the fluid inlet.

Preferably, the hole in the ring groove in which the alignment pin is secured is a blind hole which extends into the boss. This eliminates any possibility that the alignment pin might fall from the hole into the cooling gallery. In other examples, the hole may be a through hole which extends through the boss. For example, the hole may have a radially inner portion with a diameter less than that of the alignment pin and into which the alignment pin is prevented from moving.

The boss projects into the cooling gallery at a location opposite the fluid inlet. Preferably, the fluid inlet is located in a lower surface of the cooling gallery and the boss projects from an upper surface of the cooling gallery. In such embodiments, the flow of cooling fluid enters the cooling gallery from underneath the piston body and is divided by the flow splitter on the opposite, upper surface. In other examples, the fluid inlet and the boss may be located in other parts of the cooling gallery. For example, the fluid inlet may be on a radially inner side surface of the cooling gallery, with the boss projecting from a radially outer side surface of the cooling gallery.

Preferably, the cooling gallery further comprises a fluid outlet through which the flow of cooling fluid leaves the cooling gallery during operation and which is separate to the fluid inlet. In other examples, the cooling gallery may comprise a single port which acts as both a fluid inlet and fluid outlet so that cooling fluid enters into and drains from the cooling gallery at the same location.

Preferably, the fluid outlet is positioned at an opposite end of the cooling gallery to the fluid inlet such that the cooling gallery is divided into first and second cooling gallery halves by the fluid inlet and the fluid outlet. Where the cooling gallery is annular, the fluid outlet is preferably diametrically opposed to the fluid inlet.

Preferably, the fluid outlet is located in a lower surface of the cooling gallery. With such an arrangement, the cooling fluid drains away from the cooling gallery from the underside of the piston body. In certain embodiments, both the fluid inlet and the fluid outlet are located in a lower surface of the cooling gallery.

The cooling gallery may have a single fluid inlet or a plurality of fluid inlets.

The cooling gallery may have a single fluid outlet or a plurality of fluid outlets.

The piston may comprise a plurality of piston rings, each located in ring groove in the ring belt region. The piston may comprise a plurality of alignment pins, each projecting into a different one of the plurality of ring grooves to restrict circumferential displacement of the plurality of piston rings located in the plurality of ring grooves.

Preferably, the piston ring is a split ring with a ring gap between its opposed ends, wherein the alignment pin is received in the ring gap. In other examples, the alignment pin may be received in a blind cavity on a radially inner surface of the piston ring, or may simply press against the radially inner surface of the piston ring.

Preferably, the piston ring is an oil control ring or a scraper ring.

Preferably, the internal combustion engine is a vertical axis internal combustion engine. In such an engine, the crankshaft is mounted vertically in the engine. The internal combustion engine may be a petrol engine. Preferably, the internal combustion engine is a diesel engine. The internal combustion engine may be a turbocharged diesel engine.

The cooling fluid may be any suitable cooling fluid. The cooling fluid may be lubricant used in the internal combustion engine. The cooling fluid may be oil. The cooling fluid may be crankcase oil drawn up from a crankcase of the internal combustion engine during operation. The cooling fluid may be supplied to the fluid inlet of the cooling gallery along a piston rod of the piston. The internal combustion engine may further comprise a cooling fluid jet configured to spray a jet of cooling fluid towards the piston body. The cooling fluid jet may be configured to spray a jet of cooling fluid directly into the cooling gallery through the fluid inlet. Where the engine comprises a plurality of cylinders, a cooling fluid jet may be provided in each cylinder to spray cooling fluid towards the piston body from a main cooling fluid gallery of the engine, such as a main oil gallery.

As used herein, the term "engine block" refers to a solid structure in which the at least one cylinder of the engine is provided. The term may refer to the combination of a cylinder block with a cylinder head and crankcase, or to the cylinder block only. The engine block may be formed from a single engine block casting. The engine block may be formed from a plurality of separate engine block castings which are connected together, for example using bolts.

The engine block may comprise a single cylinder. Preferably, the engine block comprises a plurality of cylinders.

The engine block may comprise a single cylinder bank.

The engine block may comprise a first cylinder bank and a second cylinder bank. The first and second cylinder banks may be arranged in a V configuration.

The engine block may comprise three cylinder banks. The three cylinder banks may be arranged in a broad arrow configuration. The engine block may comprise four cylinder banks. The four cylinder banks may be arranged in a W or double-V configuration.

As used herein, the terms "upper", "lower", "underneath", "below", and similar, refer to relative positions of components of the piston when the piston is orientated such that the combustion surface is at its upper end, as shown in FIG. 4, rather than as orientated during operation, in which the piston is substantially horizontal.

According to a second aspect of the present invention, there is provided an internal combustion engine comprising: an engine block defining at least one cylinder; and a piston disposed in the at least one cylinder, wherein the piston comprises: a piston body including an upper combustion surface, an annular side wall with a ring belt region, and a cooling gallery located within the piston body radially inwardly from the ring belt region and having a fluid inlet through which a cooling fluid is supplied to the cooling gallery during operation; a piston ring located in a ring groove around the ring belt region; and an alignment pin secured in a hole in the piston side wall and projecting into the ring groove to restrict circumferential displacement of the piston ring, wherein the piston body further comprises a boss within the cooling gallery into which the hole and the alignment pin extend, wherein the boss projects into the cooling gallery opposite the fluid inlet and is shaped to provide a flow splitter surface configured to divide cooling fluid flowing through the fluid inlet during use into first and second fluid flows and to direct the first and second fluid flows in opposite directions around the cooling gallery.

According to a third aspect of the present invention, there is provided a piston for an internal combustion engine, wherein the piston comprises: a piston body including an upper combustion surface, an annular side wall with a ring belt region, and a cooling gallery located within the piston body radially inwardly from the ring belt region and having a fluid inlet through which a cooling fluid is supplied to the cooling gallery during operation; a piston ring located in a ring groove around the ring belt region; and an alignment pin secured in a hole in the piston side wall and projecting into the ring groove to restrict circumferential displacement of the piston ring, wherein the piston body further comprises a boss within the cooling gallery into which the hole and the alignment pin extend, wherein the boss projects into the cooling gallery opposite the fluid inlet and is shaped to provide a flow splitter surface configured to divide cooling fluid flowing through the fluid inlet during use into first and second fluid flows and to direct the first and second fluid flows in opposite directions around the cooling gallery.

According to a fourth aspect of the present invention, there is provided a marine vessel comprising a marine outboard motor according to the first aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Further features and advantages of the present invention will be further described below, by way of example only, with reference to the accompanying drawings in which.

DETAILED DESCRIPTION

Figure 1:
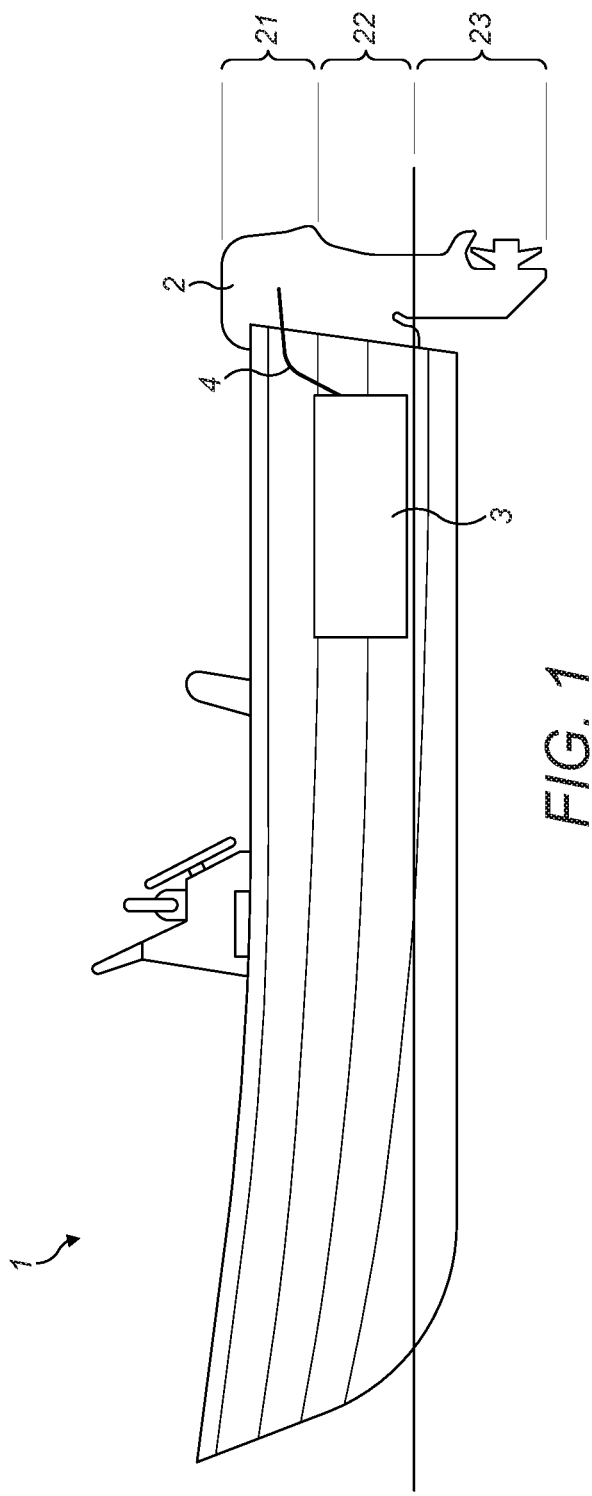
FIG. 1 is a schematic side view of a light marine vessel provided with a marine outboard motor.

FIG. 1 shows a schematic side view of a marine vessel 1 with a marine outboard motor 2. The marine vessel 1 may be any kind of vessel suitable for use with a marine outboard motor, such as a tender or a scuba-diving boat. The marine outboard motor 2 shown in FIG. 1 is attached to the stern of the vessel 1. The marine outboard motor 2 is connected to a fuel tank 3, usually received within the hull of the marine vessel 1. Fuel from the reservoir or tank 3 is provided to the marine outboard motor 2 via a fuel line 4. Fuel line 4 may be a representation for a collective arrangement of one or more filters, low pressure pumps and separator tanks (for preventing water from entering the marine outboard motor 2) arranged between the fuel tank 3 and the marine outboard motor 2.

As will be described in more detail below, the marine outboard motor 2 is generally divided into three sections, an upper-section 21, a mid-section 22, and a lower-section 23. The mid-section 22 and lower-section 23 are often collectively known as the leg section, and the leg houses the exhaust system. A propeller 8 is rotatably arranged on a propeller shaft at the lower-section 23, also known as the gearbox, of the marine outboard motor 2. Of course, in operation, the propeller 8 is at least partly submerged in water and may be operated at varying rotational speeds to propel the marine vessel 1.

Typically, the marine outboard motor 2 is pivotally connected to the stern of the marine vessel 1 by means of a pivot pin. Pivotal movement about the pivot pin enables the operator to tilt and trim the marine outboard motor 2 about a horizontal axis in a manner known in the art. Further, as is well known in the art, the marine outboard motor 2 is also pivotally mounted to the stern of the marine vessel 1 so as to be able to pivot, about a generally upright axis, to steer the marine vessel 1.

Tilting is a movement that raises the marine outboard motor 2 far enough so that the entire marine outboard motor 2 is able to be raised completely out of the water. Tilting the marine outboard motor 2 may be performed with the marine outboard motor 2 turned off or in neutral. However, in some instances, the marine outboard motor 2 may be configured to allow limited running of the marine outboard motor 2 in the tilt range so as to enable operation in shallow waters. Marine engine assemblies are therefore predominantly operated with a longitudinal axis of the leg in a substantially vertical direction. As such, a crankshaft of an engine of the marine outboard motor 2 which is substantially parallel to a longitudinal axis of the leg of the marine outboard motor 2 will be generally oriented in a vertical orientation during normal operation of the marine outboard motor 2, but may also be oriented in a non-vertical direction under certain operating conditions, in particular when operated on a vessel in shallow water. A crankshaft of a marine outboard motor 2 which is oriented substantially parallel to a longitudinal axis of the leg of the engine assembly can also be termed a vertical crankshaft arrangement. A crankshaft of a marine outboard motor 2 which is oriented substantially perpendicular to a longitudinal axis of the leg of the engine assembly can also be termed a horizontal crankshaft arrangement.

Figure 2A:
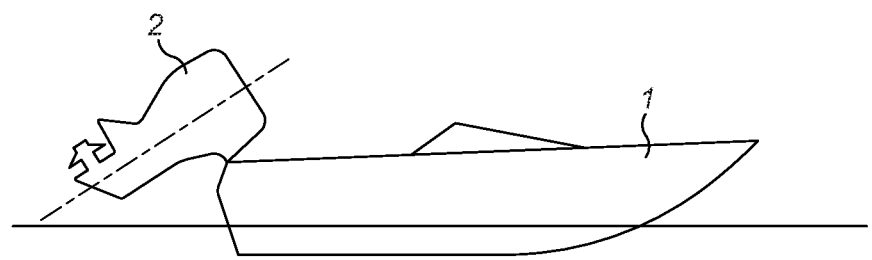
FIG. 2A shows a schematic representation of a marine outboard motor in its tilted position.

As mentioned previously, to work properly, the lower-section 23 of the marine outboard motor 2 needs to extend into the water. In extremely shallow waters, however, or when launching a vessel off a trailer, the lower-section 23 of the marine outboard motor 2 could drag on the seabed or boat ramp if in the tilted-down position. Tilting the marine outboard motor 2 into its tilted-up position, such as the position shown in FIG. 2A, prevents such damage to the lower-section 23 and the propeller.

Figure 2B:
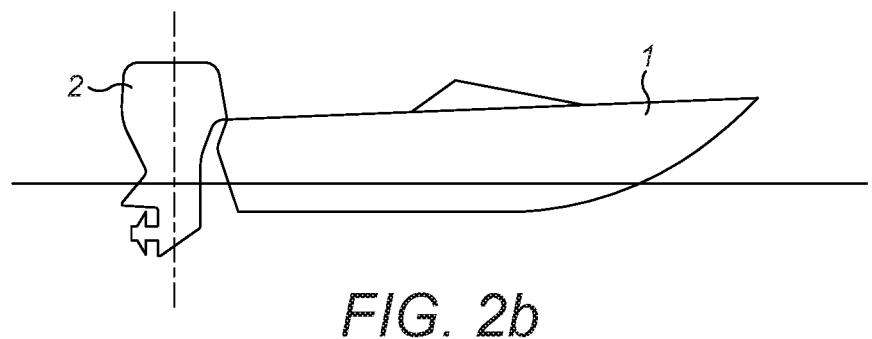
FIGS. 2B to 2D show various trimming positions of the marine outboard motor and the corresponding orientation of the marine vessel within a body of water.
Figure 2C:
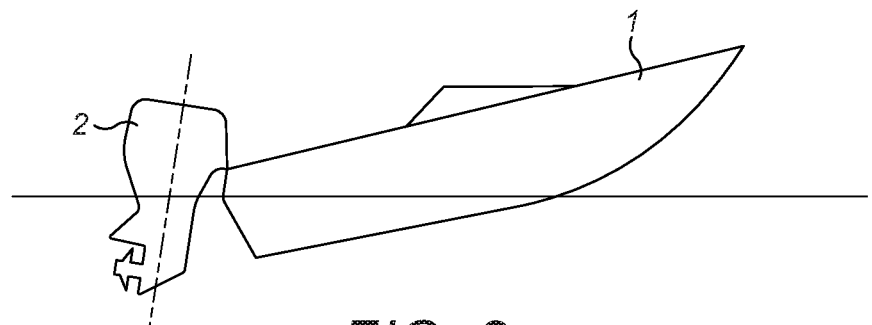
Figure 2D:
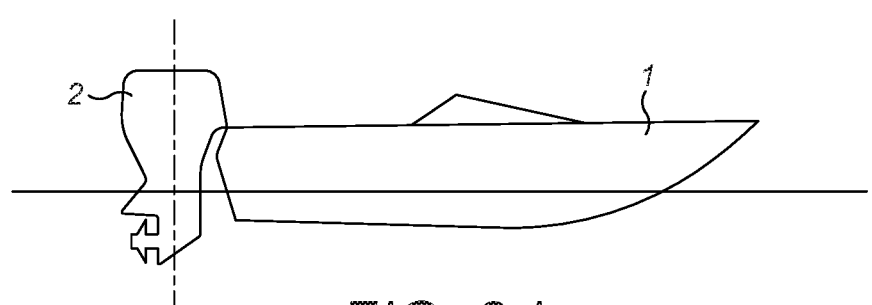

By contrast, trimming is the mechanism that moves the marine outboard motor 2 over a smaller range from a fully-down position to a few degrees upwards, as shown in the three examples of FIGS. 2B to 2D. Trimming helps to direct the thrust of the propeller 8 in a direction that will provide the best combination of fuel efficiency, acceleration and high speed operation of the marine vessel 1.

When the vessel 1 is on a plane (i.e. when the weight of the vessel 1 is predominantly supported by hydrodynamic lift, rather than hydrostatic lift), a bow-up configuration results in less drag, greater stability and efficiency. This is generally the case when the keel line of the boat or marine vessel 1 is up about three to five degrees, such as shown in FIG. 2B for example.

Too much trim-out puts the bow of the vessel 1 too high in the water, such as the position shown in FIG. 2C. Performance and economy, in this configuration, are decreased because the hull of the vessel 1 is pushing the water and the result is more air drag. Excessive trimming-out can also cause the propeller to ventilate, resulting in further reduced performance. In even more severe cases, the vessel 1 may hop in the water, which could throw the operator and passengers overboard.

Trimming-in will cause the bow of the vessel 1 to be down, which will help accelerate from a standing start. Too much trim-in, shown in FIG. 2D, causes the vessel 1 to "plough" through the water, decreasing fuel economy and making it hard to increase speed. At high speeds, trimming-in may even result in instability of the vessel 1.

Figure 3:
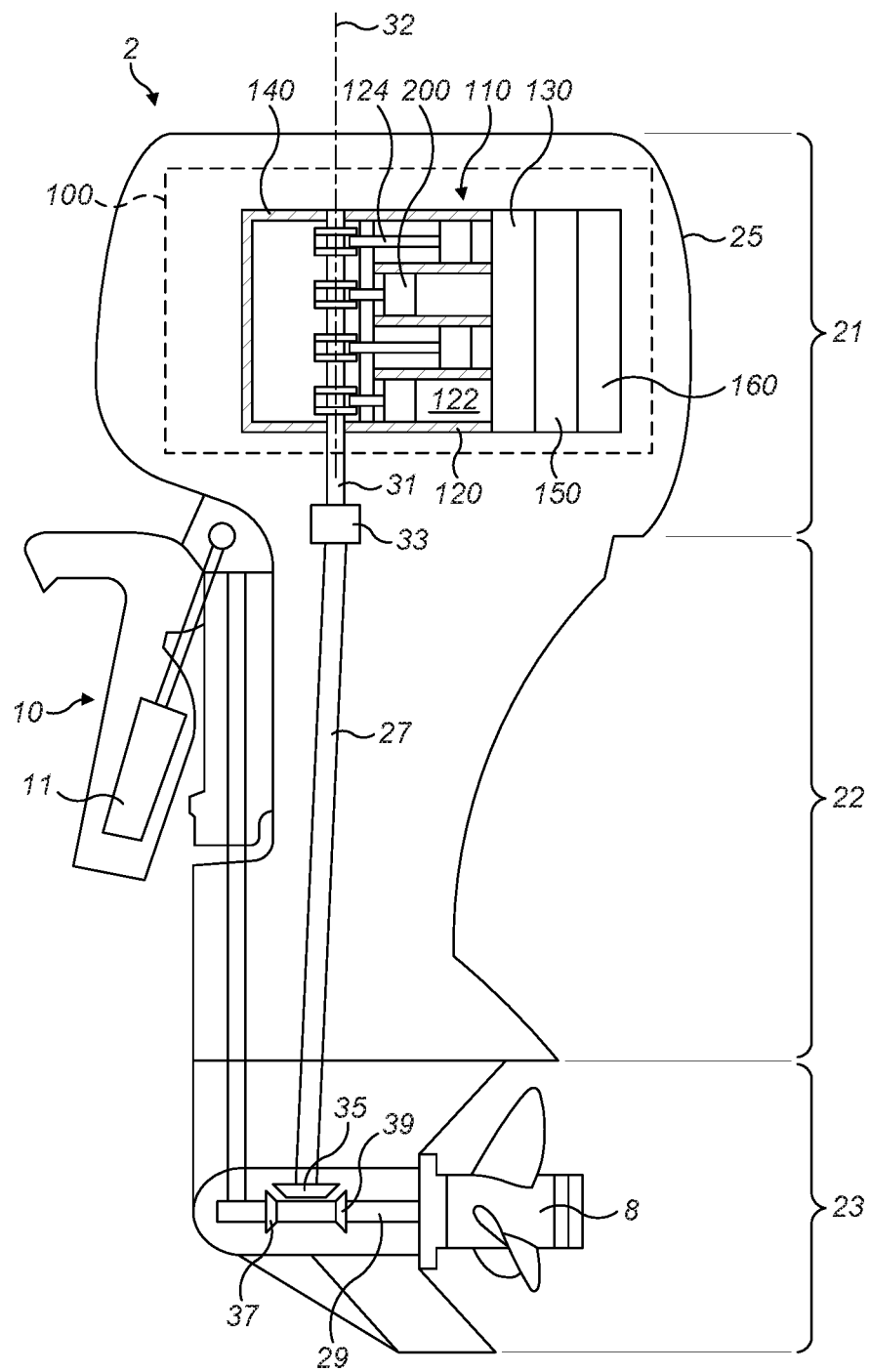
FIG. 3 shows a schematic cross-section of a marine outboard motor according to the present invention.

Turning to FIG. 3, there is shown a schematic cross-section of an outboard motor 2 according to an embodiment of the present invention. The outboard motor 2 comprises a tilt and trim mechanism 10 for performing the aforementioned tilting and trimming operations. In this embodiment, the tilt and trim mechanism 10 includes a hydraulic actuator 11 that can be operated to tilt and trim the outboard motor 2 via an electric control system. Alternatively, it is also feasible to provide a manual tilt and trim mechanism, in which the operator pivots the outboard motor 2 by hand rather than using a hydraulic actuator.

As mentioned above, the outboard motor 2 is generally divided into three sections. An upper-section 21, also known as the powerhead, includes an internal combustion engine 100 for powering the marine vessel 1. A cowling 25 is disposed around the engine 100. Adjacent to, and extending below, the upper-section 21 or powerhead, there is provided a mid-section 22 and a lower section 23. The lower-section 23 extends adjacent to and below the mid-section 22, and the mid-section 22 connects the upper-section 21 to the lower-section 23. The mid-section 22 houses a drive shaft 27 which extends between the combustion engine 100 and the propeller shaft 29 and is connected to a crankshaft 31 of the combustion engine via a floating connector 33 (e.g. a splined connection). At the lower end of the drive shaft 27, a gear box/transmission is provided that supplies the rotational energy of the drive shaft 27 to the propeller 8 in a horizontal direction. In more detail, the bottom end of the drive shaft 27 may include a bevel gear 35 connected to a pair of bevel gears 37, 39 that are rotationally connectable to the propeller shaft 29 of the propeller 8. The mid-section 22 and lower-section 23 form an exhaust system, which defines an exhaust gas flow path for transporting exhaust gases from an exhaust gas outlet 170 of the internal combustion engine 100 and out of the outboard motor 2.

The internal combustion engine 100 is shown schematically as one bank of a four-stroke V8 diesel engine. It will be understood that any other amount of cylinders may be employed in the V-shaped cylinder banks. The skilled person will also understand that any other arrangement, such as an in-line arrangement could alternatively be utilised. The engine of the present invention could equivalently be constructed as a two-stroke-type combustion engine.

The internal combustion engine 100 includes an engine block 110 comprising a cylinder block 120, a cylinder head 130, and a crankcase 140. The cylinder block defines a plurality of cylinders 122, each housing a piston 200 which reciprocates within its respective cylinder 122 and is connected to the crankshaft 31 by a piston rod 124, or "connecting rod". The crankshaft 31 is mounted in the crankcase 140 for rotation about a vertical crankshaft axis 32. The engine 100 also includes an air intake manifold 150 for delivering a flow of air to the cylinders in the engine block, an exhaust manifold 160 configured to direct a flow of exhaust gas from the cylinders. The engine 100 may further include an optional exhaust gas recirculation system (not shown) which is configured to recirculate a portion of the flow of exhaust gas from the exhaust manifold 160 to the air intake manifold 150 and which includes a heat exchanger, or "EGR cooler", for cooling the recirculated exhaust gas.

Figure 4:
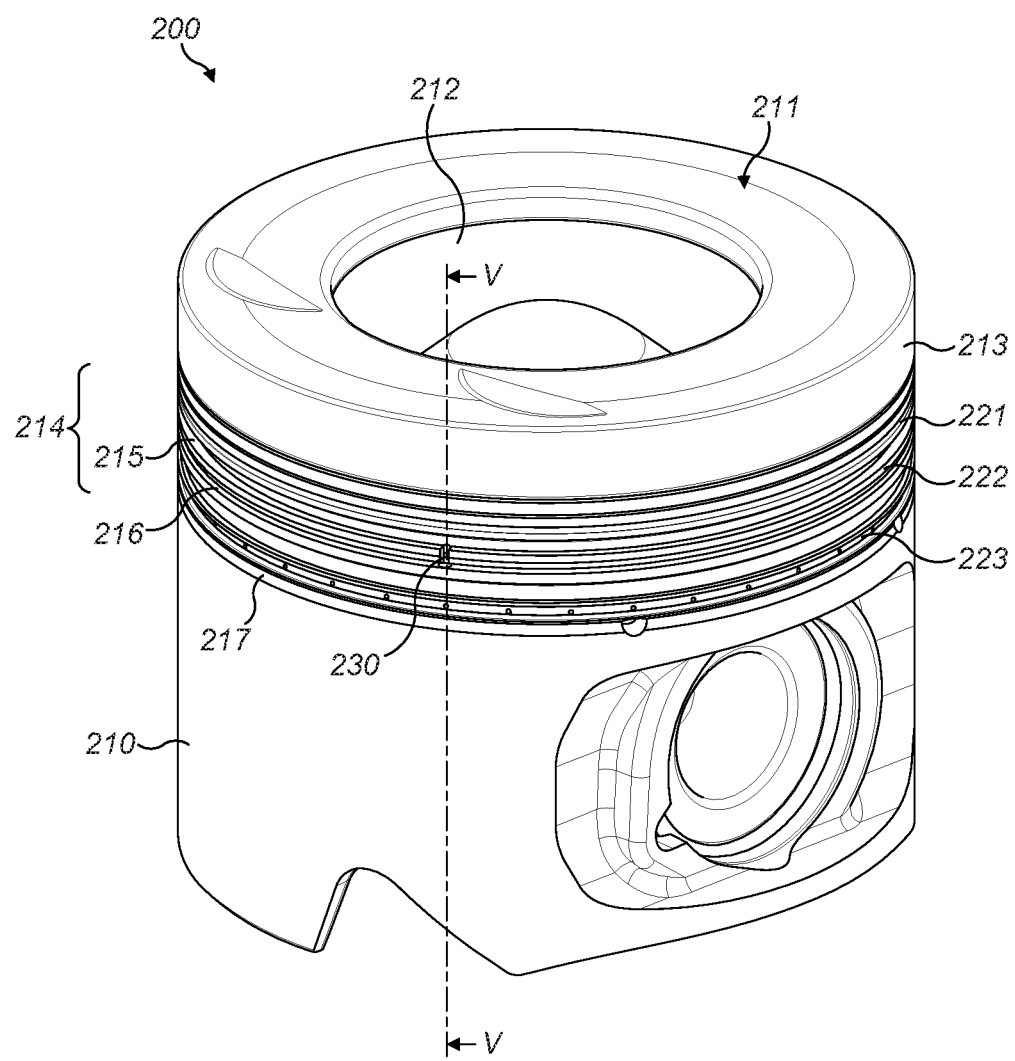
FIG. 4 shows a perspective side view of the piston of the marine outboard motor of FIG. 3.

FIG. 4 shows a perspective side view of a piston 200 according to the present invention. The piston 200 includes a piston body 210 with an upper combustion surface 211 having a combustion bowl 212, and an annular side wall 213 having a ring belt region 214. The ring belt region 214 comprises a plurality of piston rings located in a plurality of ring grooves extending circumferentially around the annular side wall 213. In this example, the ring belt region 214 includes three piston rings in the form of a compression ring 221 in a top ring groove 215, a scraper ring 222 in a second ring groove 216, and an oil control ring 223 in a third ring groove 217. However, it will be understood that any suitable number and arrangement of piston rings may be used. An alignment pin 230 is secured in one of the ring grooves 215-217 to restrict the circumferential displacement of the piston ring in that ring groove. In this example, the alignment pin 230 projects into the second ring groove 216 and so restricts rotation of the scraper ring 222. The alignment pin may alternatively project into the first or third ring grooves. Further alignment pins may be provided in the same manner to restrict rotation of other piston rings.

Figure 5:
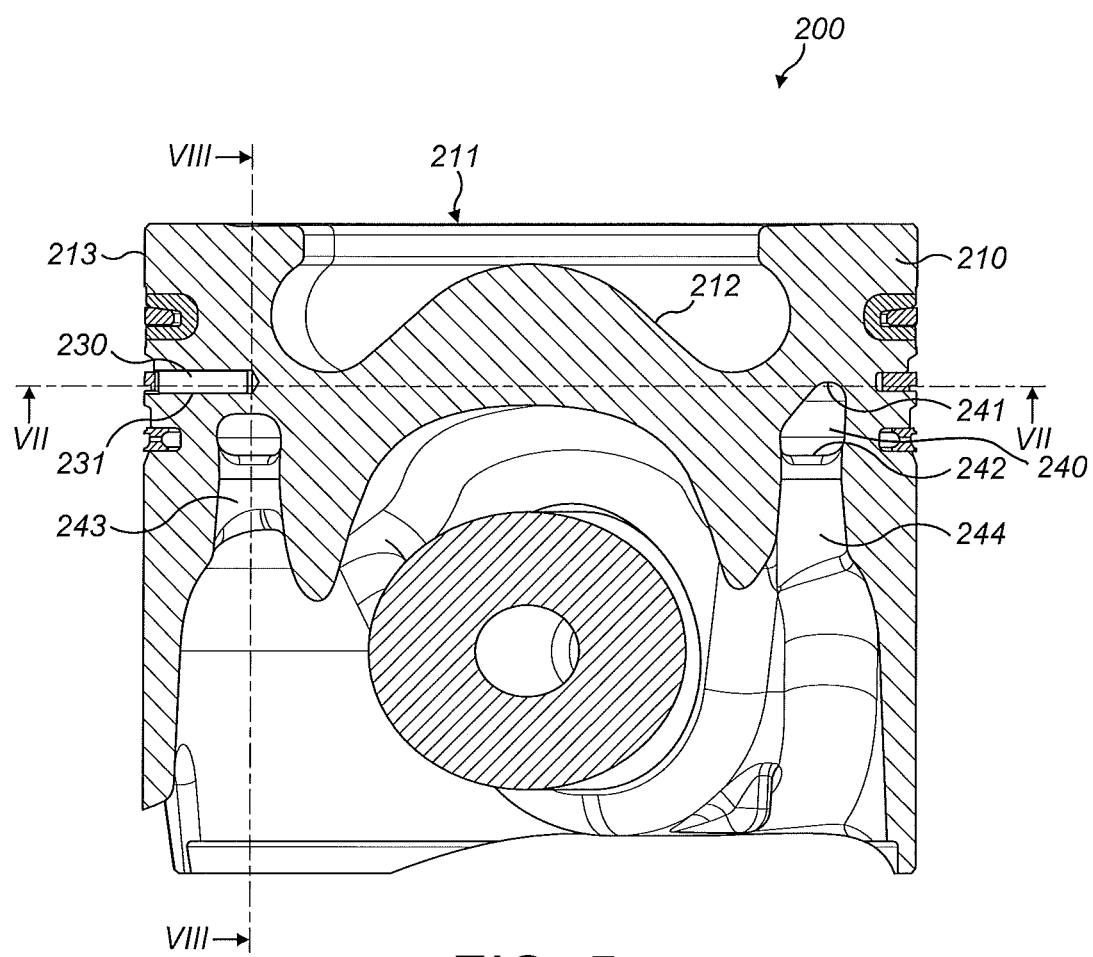
FIG. 5 shows an axial cross-sectional view of the piston of FIG. 4 taken along line V-V in FIG. 4.
Figure 6:
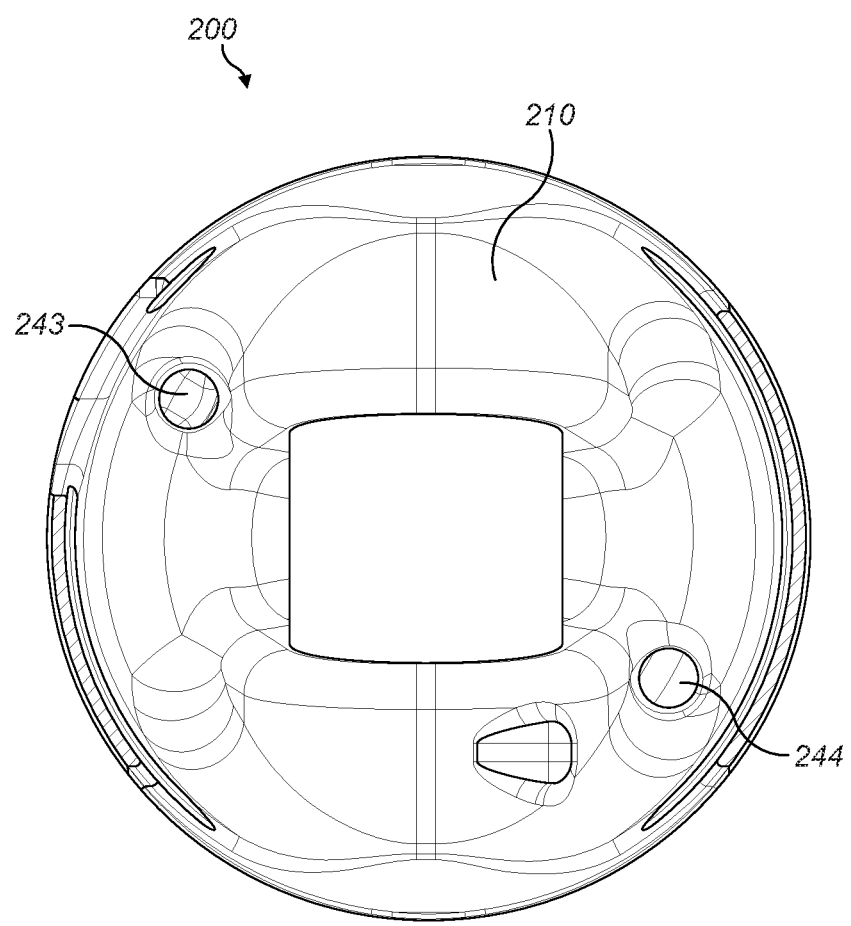
FIG. 6 shows an underside view of the piston of FIG. 4.

Referring to FIGS. 5 to 9, the piston body 210 further includes an annular cooling gallery 240 which is formed within the piston body radially inward of the ring belt portion 214 and adjacent to the rim of the combustion bowl 212. The cooling gallery 240 has an upper surface 241 and a lower surface 242. A fluid inlet 243 and a fluid outlet 244 are each provided in the lower surface 242 of the cooling gallery 240 and extend in an axial direction of the piston. Thus, the fluid inlet 243 and the fluid outlet 244 are open to the underside of the piston body 210, as best seen in FIGS. 5 and 6. In this example, the cooling gallery 240 has a single fluid inlet 243 and a single fluid outlet 244 which are positioned at diametrically opposite ends of the annular cooling gallery 240 to each other. The fluid inlet 243 and fluid outlet 244 divide the cooling gallery 240 into a first and second cooling gallery halves 245 and 246, in which the first cooling gallery half extends from the fluid inlet 243 to the fluid outlet 244 in a first circumferential direction and the second cooling gallery half extends from the fluid inlet 243 to the fluid outlet 244 in a second circumferential direction which is opposite to the first circumferential direction.

Figure 7:
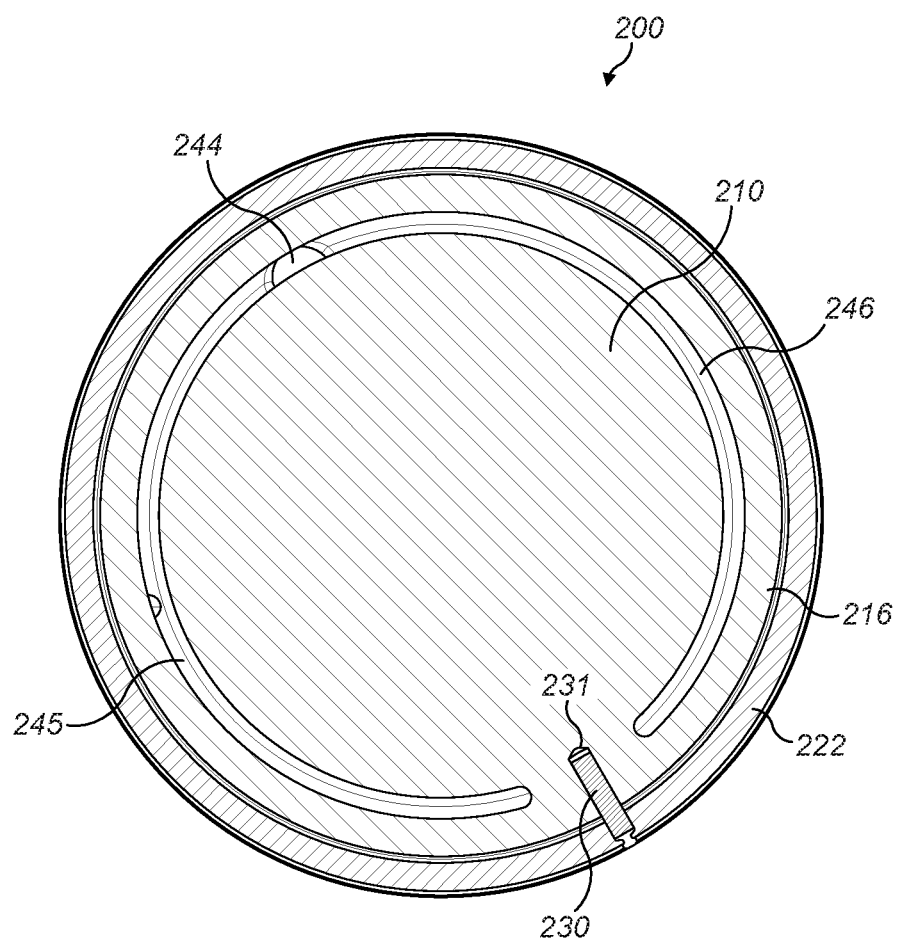
FIG. 7 shows a lateral cross-sectional view of the piston of FIG. 4 taken along line VII-VII in FIG. 5.

The alignment pin 230 is secured in a hole 231 which has an opening in the middle ring groove 216 and extends into the side wall 213 of the piston body 210. The hole 231 is preferably a drilled hole. The annular cooling gallery 240 is located close to the upper end of the piston body 210 ensure close proximity to the combustion bowl 212 for effective cooling. However, this means that the annular cooling gallery 240 is located directly radially inward of the ring belt region 214 and thus limits the radial thickness of the side wall 213 in which the alignment pin 230 may be retained. To address this, the piston body 210 further includes a boss 250 which projects downwards into the cooling gallery 240 from the upper surface 241. The boss 250 is an extension of the piston body and provides additional material into which the hole 231 can extend. This improves the degree to which the alignment pin 230 is securely retained in the hole 231. In this example, the hole 231 is a blind hole which extends uninterrupted from a radially outer open end in the ring groove 216 to a radially inner closed end within the boss 250. The hole 231 thus terminates in the boss 250. In this manner, the alignment pin 230 is prevented from falling into the cooling gallery 240 where it might otherwise obstruct the flow of cooling fluid and impact on the cooling performance of the piston. As shown in FIG. 7, the scraper ring 222 is a split ring and the alignment pin 230 projects in the ring groove such that it is received in the ring gap 224 between opposed ends of the split ring. This prevents circumferential rotation of the scraper ring 222 relative to the piston body 210.

Figure 8:
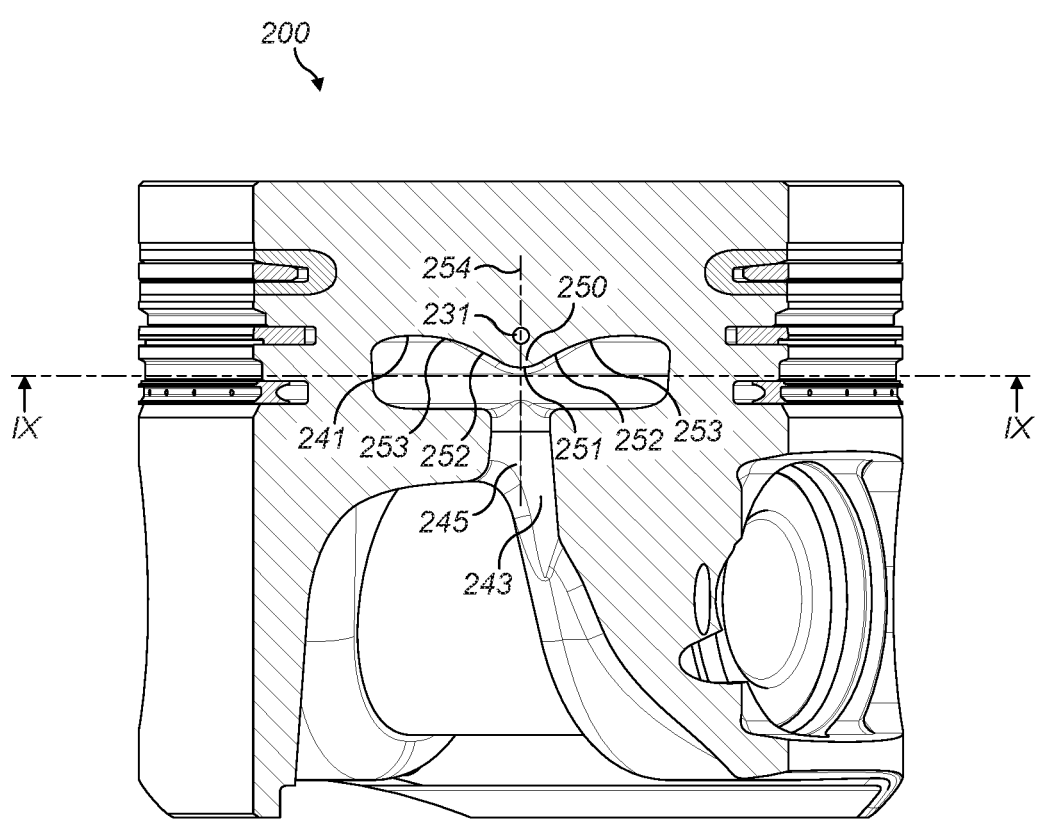
FIG. 8 shows an axial cross-sectional view of the piston of FIG. 4 taken along line VIII-VIII in FIG. 5.
Figure 9:
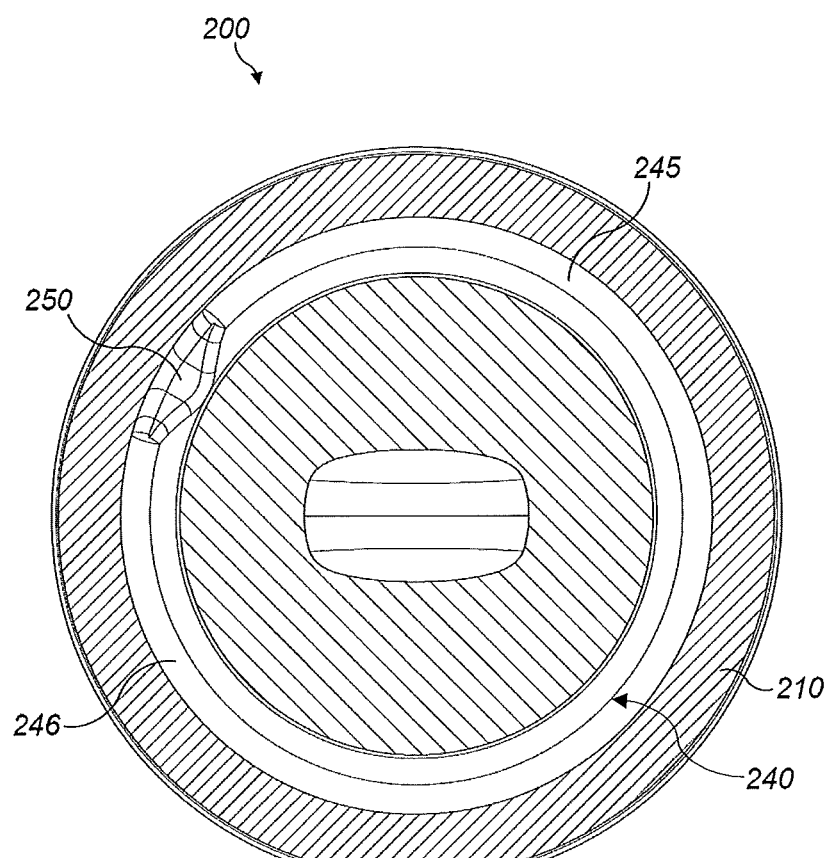
FIG. 9 shows a lateral cross-sectional view of the piston of FIG. 4 taken along line IX-IX in FIG. 8.

As best seen in FIG. 8, although the boss 250 causes a local reduction in height of the cooling gallery 240, the inventors have used this to their advantage by positioning the boss 250 directly opposite the fluid inlet 243 and shaping it to define a flow splitter surface which improves coolant flow around the cooling gallery 240. The flow splitter surface has a curved shape. That is, the flow splitter surface has a shape which has at least one curved portion. In this example, the flow splitter surface has a curved peak 251, side flanks 252 extending away from the curved peak 251, and curved ramps 253 which form a transition between the side flanks 252 and the adjacent parts of the upper surface 241 of the cooling gallery 240. In this example the flow splitter surface is symmetrical about its central axis 254. The central axis 254 of the flow splitter surface may be aligned with the central axis 245 of the fluid inlet 243, as shown in FIG. 8, or offset in a radial and/or circumferential direction.

During operation, cooling fluid is directed towards the underside of the piston body 210 and enters the cooling gallery 240 in an axial direction as a flow of cooling fluid through the fluid inlet 243. For example, each cylinder may comprise a fluid jet which is fed from the main oil gallery and which sprays oil towards the underside of the piston body. Upon entry into the cooling gallery 240, the flow of cooling fluid impacts against the flow splitter surface of the boss 250 positioned directly opposite the fluid inlet 243 by which it is divided into first and second fluid flows on either side of the flow splitter surface. The first fluid flow is directed by the flow splitter surface in the first circumferential direction around the first cooling gallery half 245. The second fluid flow is directed by the flow splitter surface in the second circumferential direction around the second cooling gallery half 246. By passing around the cooling gallery, the cooling fluid draws heat around from the combustion surface 211 and the combustion bowl 212 to reduce the maximum operating temperature of the piston 200. The first and second fluid flows then leave the cooling gallery 240 via the fluid outlet 244.

By providing a boss in the cooling gallery which provides additional side wall thickness and is configured as a flow splitter surface, both alignment pin retention and piston cooling performance can be improved with the piston of the present invention.

Although the invention has been described above with reference to one or more preferred embodiments, it will be appreciated that various changes or modifications may be made without departing from the scope of the invention as defined in the appended claims.

The invention claimed is:

1. A piston for an internal combustion engine, the piston comprising:
   a piston body including an upper combustion surface, an annular side wall with a ring belt region, and a cooling gallery located within the piston body radially inwardly from the ring belt region and having a fluid inlet through which a cooling fluid is supplied to the cooling gallery during operation;
   a piston ring located in a ring groove around the ring belt region; and
   an alignment pin secured in a blind hole in the piston side wall and projecting into the ring groove to restrict circumferential displacement of the piston ring,
   wherein the piston body further comprises a boss within the cooling gallery into which the blind hole and the alignment pin extend, wherein the boss projects into the cooling gallery opposite the fluid inlet and is shaped to provide a flow splitter surface configured to divide cooling fluid flowing through the fluid inlet during use into first and second fluid flows and to direct the first and second fluid flows in opposite directions around the cooling gallery.

2. The piston of claim 1, wherein the cooling gallery is annular.

3. The piston of claim 2, wherein the flow splitter surface is configured to direct the first fluid flow around the annular cooling gallery in a first circumferential direction and to direct the second fluid flow around the annular cooling gallery in a second circumferential direction which is opposite to the first circumferential direction.

4. The piston of claim 1, wherein the flow splitter surface is substantially symmetrical.

5. The piston of claim 1, wherein the flow splitter surface has a curved shape.

6. The piston of claim 1, wherein the flow splitter surface is aligned with the fluid inlet.

7. The piston of claim 1, wherein the blind hole terminates within the boss.

8. The piston of claim 1, wherein the fluid inlet is located in a lower surface of the cooling gallery and the boss projects from an upper surface of the cooling gallery.

9. The piston of claim 1, wherein the cooling gallery further comprises a fluid outlet through which the flow of cooling fluid leaves the cooling gallery during operation and which is separate to the fluid inlet.

10. The piston of claim 9, wherein the fluid outlet is positioned at an opposite end of the cooling gallery to the fluid inlet such that the cooling gallery is divided into first and second cooling gallery halves by the fluid inlet and the fluid outlet.

11. The piston of claim 9, wherein the fluid outlet is located in a lower surface of the cooling gallery.

12. The piston of claim 1, wherein the piston ring is a split ring with a ring gap between its opposed ends and wherein the alignment pin is received in the ring gap.

13. The piston of claim 1, wherein the piston ring is an oil control ring or a scraper ring.

14. The piston of claim 1, wherein the internal combustion engine is a vertical axis internal combustion engine.

15. An internal combustion engine comprising:
an engine block defining at least one cylinder; and
the piston of claim 1 disposed in the at least one cylinder.

16. The piston of claim 1 wherein the piston is for a marine vessel comprising a marine outboard motor 1.

17. A marine outboard motor having an internal combustion engine, the internal combustion engine comprising:
an engine block defining at least one cylinder; and
the piston of claim 1 disposed in the at least one cylinder.

* * * * *